United States Patent [19]

Fogel et al.

[11] Patent Number: 5,595,597
[45] Date of Patent: Jan. 21, 1997

[54] PROCESS FOR PRODUCING PHOSPHOMAGNESIA CEMENTS HAVING REDUCED SENSITIVITY TO WATER

[75] Inventors: William Fogel, Ales; Eric Garcin, Lyons, both of France

[73] Assignee: Rhone-Poulenc Chimie, Courbevoie Cedex, France

[21] Appl. No.: 611,683

[22] Filed: Mar. 6, 1996

Related U.S. Application Data

[62] Division of Ser. No. 366,092, Dec. 29, 1994, Pat. No. 5,518,541.

[30] Foreign Application Priority Data

Dec. 31, 1993 [FR] France ................................ 93 15987

[51] Int. Cl.⁶ ........................................ C04B 12/02
[52] U.S. Cl. ........................... 106/691; 106/690; 106/806; 106/816; 106/817; 106/819; 106/823; 423/306; 524/2; 524/3; 524/650
[58] Field of Search ............................ 106/690, 691, 106/802, 806, 816, 817, 819, 823; 423/305, 306, 307; 524/2, 3, 650

[56] References Cited

U.S. PATENT DOCUMENTS

| | | | |
|---|---|---|---|
| 2,995,453 | 8/1961 | Noble et al. | 106/690 |
| 3,525,632 | 8/1970 | Enoch | 106/690 |
| 3,647,488 | 3/1972 | Brigham et al. | 106/690 |
| 3,649,732 | 3/1972 | Brigham et al. | 106/691 |
| 4,174,227 | 11/1979 | Tomic | 106/690 |
| 4,312,674 | 1/1982 | Stalego et al. | 106/690 |
| 4,487,632 | 12/1984 | Sherif et al. | 106/690 |
| 4,734,133 | 3/1988 | Sherif et al. | 106/690 |
| 4,755,227 | 7/1988 | Sherif et al. | 106/691 |
| 4,758,278 | 7/1988 | Tomic | 106/690 |
| 4,786,328 | 11/1988 | Weill et al. | 106/691 |
| 5,279,665 | 1/1994 | Yunovich et al. | 106/690 |
| 5,382,289 | 1/1995 | Bambauer et al. | 106/691 |

*Primary Examiner*—Karl Group
*Assistant Examiner*—Michael Marcheschi
*Attorney, Agent, or Firm*—Burns, Doane, Swecker & Mathis, L.L.P.

[57] ABSTRACT

Phosphomagnesia compositions settable into improvedly water-insensitive cements that retain their mechanical properties comprise an intimate admixture of (i) a binder phase including (a) at least one phosphorous compound ($P_2O_5$ or derivative/precursor thereof) and (b) at least one magnesium compound reactive therewith in the presence of water, (ii) an effective amount of cementitious aggregate, and (iii) a water sensitivity-reducing amount of at least one silicone homogeneously distributed therethrough.

24 Claims, No Drawings

PROCESS FOR PRODUCING PHOSPHOMAGNESIA CEMENTS HAVING REDUCED SENSITIVITY TO WATER

This application is a divisional of application Ser. No. 08/366,092, filed Dec. 29, 1994 now U.S. Pat. No. 5,518,541.

BACKGROUND OF THE INVENTION

1. Field of the Invention

The present invention relates to improvedly water-insensitive phosphomagnesia cements and compositions for the formulation thereof.

2. Description of the Prior Art

One of the major applications for the phosphomagnesia cements is in the rapid repair of roads, highways, bridges and airport runways. They are used to fill cracks or holes, or to cover degraded or worn areas. Other than adhering well to Portland cement, these phosphomagnesia cements have a high modulus of rupture and crush resistance, which translates that they are particularly suitable for such applications. In addition, the setting time for these cements can be as low as a few tens of minutes. Thus, once the route or roadway has been repaired, it can be reopened to traffic in a matter of a few hours after treatment.

The problem, however, is that the phosphomagnesia cements are sensitive to water. Their mechanical properties deteriorate when immersed, or simply when contacted with water.

One solution to this problem is to treat the external face surfaces of the cement with a waterproofing compound.

However, even though the aforesaid properties are improved, this type of treatment is not completely satisfactory in that it is not permanent. Indeed, whatever the application of the cement, in particular those indicated above, they are always subject to a greater or lesser degree of wear which causes the coating to disappear more or less rapidly. The cement surface must then be again treated if acceptable mechanical properties are to be retained.

It is thus apparent that this type of solution is not satisfactory as regards the final properties of the cement, nor as regards cost, since the treatment must be repeated at regular intervals.

SUMMARY OF THE INVENTION

Accordingly, a major object of the present invention is the provision of improved formulations for the production of phosphomagnesia cements whose sensitivity to water is considerably reduced with lasting effect.

Briefly, the present invention features the production of phosphomagnesia cements by intimately admixing constituent elements comprising a first, phosphorus based constituent and a second, magnesium based constituent, said two constituents being designated the "binder," with at least one silicone compound and with water.

The present invention also features cement compositions, per se, comprising a first, phosphorus based constituent and a second, magnesium based constituent, the two constituents being designated the binder phase, and at least one silicone compound homogeneously distributed therethrough.

DETAILED DESCRIPTION OF BEST MODE AND PREFERRED EMBODIMENTS OF THE INVENTION

More particularly according to the present invention, by the term "cement" are intended compositions comprising the aforesaid first and second constituents, together with, if required, the usual cement additives, and compositions based on said two constituents indicated above and, optionally, conventional cement additives, and also comprising aggregates.

The constituent elements of the phosphomagnesia cement will first be described.

The cements of this invention thus comprise a binder phase including a first, phosphorus based constituent and a second, magnesium based constituent.

Any phosphorus compound can be used, provided that it includes phosphorus pentoxide, either directly or in the form of a precursor thereof.

Exemplary phosphorus based compounds include phosphorus pentoxide, phosphoric acid or derivatives thereof, such as orthophosphoric acid, pyrophosphoric acid, or polyphosphoric acid, or salts of these acids, such as the phosphates, hydrogen phosphates, orthophosphates, pyrophosphates, polyphosphates, tripolyphosphates or tetrapolyphosphates of aluminum, calcium, potassium, magnesium or ammonium, or mixtures thereof.

It should be noted that phosphorus-containing effluents from the fertilizer manufacturing industry or from steelworks (steel pickling, corrosion reduction treatment) can be used as the phosphorus based constituent. Green phosphoric acid can also be used.

Salts of the phosphorus based acids indicated above are employed in one particular embodiment.

The phosphates and hydrogen phosphates of potassium, magnesium or ammonium, or mixtures thereof, are preferably used. Ammonium dihydrogen phosphate is the most preferred.

The phosphorus based constituent can be used in either a liquid or solid form.

Preferably, said constituent is used in the solid form.

In a first embodiment, the constituent is in the form of particles, in particular in which the granulometry is at most 300 μm. It will be appreciated that this value is not critical and that, if constituents are used which have a particle size of more than 300 μm, grinding is desirable prior to incorporation into the compositions of the invention.

In a second embodiment, the constituent is employed in a form which is adsorbed onto a porous support. The support may, for example, be diatomaceous earth, clay, bentonite, silica or alumina. Adsorption is carried out via known techniques. Thus, the solution or suspension of phosphorus based constituent is typically contacted with the support, with agitation, and the resulting suspension is heated to evaporate off the excess liquid. This operation can also be carried out by impregnating the support in a drum or on a rotating disc.

The second element of the binder phase comprises at least one magnesium based constituent.

Any magnesium compound can be used per the present invention, provided that it reacts with the first constituent in the presence of water.

Exemplary such constituents include magnesium oxide, magnesium hydroxide and magnesium carbonate.

In a preferred embodiment, a magnesium oxide based constituent is used. Dead burned magnesia, normally obtained by calcining magnesium carbonate at temperatures in excess of 1,200° C., is particularly suitable.

The magnesium oxide can advantageously be used in its pure form, or it may include at least one element selected from among calcium, silicon, aluminum or iron. These elements are generally in the form of the oxide or hydroxide thereof. One example of this type of compound is dolomite, a mixture containing, principally, magnesium oxide and calcium oxide.

If pure magnesium oxide is used, it is at least 80% pure.

The magnesium based constituent preferably has a specific surface area of less than 2 $m^2/g$. More preferably, the specific surface area is less than 1 $m^2/g$.

The granulometry of this second constituent generally ranges from 10 to 500 μm. Compounds having a granulometry outside this range may be used, but this presents no particular advantage. Thus, if the granulometry is in excess of 500 μm, grinding may be necessary prior to incorporation into the composition. On the other hand, if the granulometry of the constituents is less than 10 μm, the properties of the composition contacted with water may be altered. In particular, the setting rate of the cement may increase unless the concentration of retarding agent or retardant is increased, as will be described below. The cement produced would then be of less importance as regards its mode of use or cost.

It should be appreciated that the two constituents described above, if in the solid state, may be ground prior to use in the process of the invention.

The proportion of magnesium based constituent (expressed in terms of weight of MgO) with respect to that of the phosphorus based constituent (expressed in terms of weight of $P_2O_5$) preferably ranges from 1 to 3.

The binder phase, i.e., the phosphorus and the magnesium based constituents, constitutes 10 to 40 parts by weight of the composition. Preferably, the binder phase constitutes 15 to 30 parts by weight thereof.

The cement prepared via the process of the invention may also comprise a retarding agent as a constituent element. More particularly, these agents are selected from among compounds which can form a complex with magnesium.

Exemplary such compounds include carboxylic acids such as citric, oxalic or tartaric acid, acids, esters or salts containing boron, acids, esters or salts containing phosphorus such as sodium tripolyphosphate, ferrous sulfate, sodium sulfate and lignosulfonate, zinc chloride, copper acetate, sodium gluconate, the sulfate acetate of sodium cellulose, the product of the reaction of formaldehyde with aminolignosulfate, dialdehyde starch, N,N-dimethyloldihydroxyethylene urea, silicofluorides, tall oil and sucrose, these compounds being used either alone or in admixture.

Preferably, the carboxylic acids are employed, either alone or as a mixture, or acids, esters or salts containing boron.

Exemplary of this latter category of compounds are boric acid and its salts, such as alkali metal salts, for example sodium (borax), or amine or ammonium salts. Boric acid esters are also suitable, such as trialkyloxyborates or triaryloxyborates.

Preferably, the additive is incorporated in the form of a powder having an average diameter of 10 to 200 μm.

The amount of setting retardant in the final cement ranges from 0% to 4 parts by weight.

An essential parameter of the process of the invention is that at least one silicone compound is used.

Suitable such silicones are compounds containing polysiloxane chains of type $RSiO_{0.5}$ (unit M), $R_2SiO$ (unit D), $R_3SiO_{1.5}$ (unit T) and $SiO_2$ (unit Q). In these formulae, the radicals R, which may be identical or different, may be hydrogen, linear or branched alkyl radicals, or vinyl, phenyl or 3,3,3-trifluoropropyl radicals.

More preferably, the alkyl radicals have from 1 to 8 carbon atoms. Exemplary thereof are methyl, ethyl, propyl, isopropyl, tertiobutyl, n-hexyl, or n-octyl radicals. The methyl radical is preferred.

In one preferred embodiment, a hydrogenated alkyl silicone is used.

Any hydrogenated alkyl silicone can thus be employed. Preferably, the silicone comprises from 30 to 120 recurring structural units.

In particular, the silicone principally comprises the recurring structural units M and D.

The aforesaid silicones may be in the form of a solution or a solid, in particular in the form of a resin, an oil or an emulsion, preferably in water.

The amount of silicone employed in the process of the invention is characteristically less than or equal to 2 parts by weight. Preferably, this amount is less than or equal to 1 part by weight.

The cements which are produced via the process of the invention characteristically comprise an aggregate as a constituent element thereof.

Exemplary of these aggregate compounds are silica, sand, alumina, zirconia, zirconium oxide, unrefined dolomite, chrome ore, limestone, clinker, vermiculite, perlite, fuel ash, or condensed silica smoke, whether used alone or in admixture.

In a preferred embodiment, sand is used which may or may not be combined with fuel ash and/or condensed silica smoke.

More particularly, the sand conforms to AFNOR standard NFP 15-403.

The fuel ash which can be used is typically aluminosilicate ash, in particular from combustion in power stations.

The ash generally has a granulometry ranging from 0.5 to 200 μm.

The condensed silica smoke, which may be a constituent of the composition of the invention, generally has a specific surface area ranging from 20 to 30 $m^2/g$.

The amount of aggregate advantageously ranges from 60 to 90 parts by weight. Preferably, the amount of aggregate ranges from 65 to 85 parts by weight.

Advantageously, the concentration of fuel ash and/or condensed silica smoke in the aggregate ranges from 4 to 6 parts by weight.

The cements produced via the process of the invention can also contain, as a constituent element thereof, any known additive typically incorporated in cement compositions.

Exemplary such optional supplementary additives include liquefying agents such as sodium lignosulfonate and condensates of naphthalene sulfonate, naphthalene, sodium tripolyphosphate or hexametaphosphate, ammonium hydrogen phosphate, melanin and alkyl siliconates.

Anti-foaming agents can also be employed in the process of the invention. Exemplary thereof are the polydimethylsiloxane based anti-foaming agents.

These additives are generally not present in amounts of more than 5 parts by weight. Preferably, the amount of this additive ranges from 0 to 2 parts by weight.

The process of the invention comprises intimately admixing the constituents described above with water.

Two possible techniques may be used, namely, bringing all of the constituent elements of the cement and water together either simultaneously or separately. In the latter technique, in general a composition containing the binder phase, aggregate, retarding agent if required, and all or a fraction of the optional additives described above is prepared. This is then mixed with water which may contain the elements not introduced into the composition in the previous step.

When the composition is pre-prepared, it will be appreciated that the silicone employed in the process of the invention can be introduced as a constituent of the composition, or as an additive which is introduced with the water. The two options may be simultaneously carried out. The essential feature is that the silicone is uniformly distributed in the resulting cement, more particularly that it is homogeneously distributed through the mass of the cement.

The amount of water added is such that a plastic, homogeneous and malleable paste is obtained.

The amount of water added does not normally exceed 15% by weight, more particularly 10% by weight with respect to the binder phase, aggregates and retarding agent if present.

The constituent elements of the cement are mixed together under shearing conditions, for example in a mixing machine.

The mixing operation is advantageously carried out at a temperature close to ambient temperature.

The mixing operation is carried out for between a few minutes and 1 hour.

The setting time of the resulting cement is advantageously less than 2 hours, more preferably less than 1 hour.

As indicated above, the present invention provides a composition for a phosphomagnesia cement. It comprises a first, phosphorus based constituent, a second, magnesium based constituent, i.e., the binder phase, and at least one silicone compound distributed therethrough.

In one preferred embodiment of the invention, such a composition has the following proportions, in parts by weight:

(a) Binder phase: 10–40 $MgO/P_2O_5$ proportion: 1 to 3
(b) Aggregate: 60–90
(c) Retarding agent: 0–4
(d) Silicone: $\leq 2$
(e) Additives: 0–5

In another preferred embodiment of the invention, the composition has the following proportions, in parts by weight:

(a) Binder phase: 15–30 $MgO/P_2O_5$ proportion: 1 to 3
(b) Aggregate: 65–85
(c) Retarding agent: 0–4
(d) Silicone: $\leq 1$
(e) Additives: 0–2

The composition of the invention is formulated by mixing the elements defined above. Depending on the form of the various constituent elements, one skilled in this art can readily determine which order of introduction is most suitable, taking account that contacting the phosphorus based constituent with the magnesium based constituent in the presence of water should be avoided, such that the reaction between the two constituents and subsequent solidification is not initiated.

If, for example, one or more of the elements contain water, it may either be dried using any known means before formulation into the composition, or an intermediate drying step can be carried out during formulation of the composition such that the aforesaid two constituents do not come into contact simultaneously with water.

If it is preferred to formulate the above element(s) in a form which introduces water, then the cement proper must be used as soon as it has been prepared. However, it may be more advantageous to prepare a composition which is as complete as possible in order to simplify the final preparation step of the cement.

The mixing is carried out using any type of mixing machine.

The mixing operation is advantageously carried out at a temperature ranging from ambient temperature to 100° C.

This is carried out for from several minutes to 4 hours.

The composition obtained can be stored for an indefinite period of time, provided that it is not stored in the presence of water.

In order to further illustrate the present invention and the advantages thereof, the following specific examples are given, it being understood that same are intended only as illustrative and in nowise limitative.

In said examples to follow, the techniques indicated hereinbelow were used to prepare the compositions of the invention and to prepare the cement samples to provide the modulus of rupture and crush resistance values:

Composition preparation:

A mixture containing the phosphorus based and magnesium based constituents, aggregate and setting retardant was prepared and homogenized for 1 hour between rollers.

The mixing water and additives (for example anti-foaming agent or liquefying agent), were weighed and placed in a mixing machine (conforming to AFNOR standard P15-411 (ASTM C305)) with a slow mixing speed (60 rpm).

The mixture was rapidly poured therein and mixed slowly for 30 seconds, then rapidly (120 rpm) for 4 minutes.

Mechanical resistance/strength measurements:

Sample preparation: AFNOR standard P15-413

After mixing, the mortar was transferred into mild steel molds.

The filled mold was fixed to a compacting machine to settle the mortar. It operated as follows:

The mold was fixed to a table moved by a cam which caused a 15 mm drop shock with each turn. A period of 60 shocks was set.

After one hour, the samples were removed from the mold and dried at 21° C. in a relative humidity of 50%.

The modulus of rupture was the pressure required to break a sample placed in a 3-point head. An average value was taken of the three samples prepared.

The crush resistance was determined using the broken samples (6 pieces). They were placed between two 4×4 cm jaws and compressed until they shattered.

The result reported was the average value of the 6 pieces.

EXAMPLE 1

(Comparative)

The following composition was prepared (values given in parts by weight):

| | | |
|---|---|---|
| (i) $NH_4H_2PO_4$ (MAP B - RHONE-POULENC) | 40 μm | 11.5 |
| (ii) MgO (Insulmag 4 - STEETLEY) | 20 μm Specific surface area <1 m²/g | 13.5 |
| (iii) $H_3BO_3$ (PROLABO) | 90 μm | 1 |
| (iv) Sand AFNOR NFP 15-403 | — | 70 |
| (v) Fuel ash | 0.5–200 μm | 5 |

-continued

| | | |
|---|---|---|
| (vi) Water | — | 7.5 |
| (vii) Antifoaming agent (Rhodorsil ® RH414 - RHONE-POULENC) | — | 0.23 |

The phosphorus based and magnesium based constituents, sand, fuel ash and retarding agent were mixed together in a mixing machine and homogenized for about 2 hours.

The mixing water and anti-foaming agent were weighed and placed in the mixing machine in contact with the mixture (AFNOR standard P 15-411).

After mixing, the resulting mixture was vibrated for 2 minutes using a mechanical vibrator, then transferred into mild steel molds to provide 3 mortar samples.

The samples were removed from the mold after 1 hour and dried at 21° C. in a relative humidity of 50% for 7 days.

After drying, 3 were immersed in water and 3 others were dried in air for 7 days.

The setting time required for this formulation was 30 minutes.

The modulus of rupture and crush resistance of the samples were measured as described.

The results obtained are reported in the following Table 1:

TABLE 1

| Treatment | 14 days dry | 7 days dry +7 days wet | Δ % |
|---|---|---|---|
| Crush resistance (kg/cm$^2$) | 630 | 440 | −30.2 |
| Modulus of rupture (kg/cm$^2$) | 120 | 100 | −16.7 |

EXAMPLE 2

Samples were prepared using the composition of Example 1, but also adding 1% by weight, with respect to the solids, of Rhodorsil® H68 (RHONE-POULENC) hydrogenated methyl silicone oil, to the mixing water.

The modulus of rupture and crush resistance test results obtained are reported in the following Table 2:

TABLE 2

| Treatment | 14 days dry | 7 days dry +7 days wet | Δ % |
|---|---|---|---|
| Crush resistance (kg/cm$^2$) | 630 | 590 | −6.3 |
| Modulus of rupture (kg/cm$^2$) | 100 | 130 | −30.0 |

This Table 2 evidences that the addition of 1% of Rhodorsil® H68 oil retained the same dry crush resistance as the comparative sample, but greatly improved same in a wet environment (reducing the resistance loss in both types of treatment).

When dry, even though a reduction in the modulus of rupture was determined between the comparative sample and the samples containing Rhodorsil® H68 oil, the addition of oil substantially improved the resistance of the material when wet (+30.0%).

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for formulation of a phosphomagnesia composition of matter, comprising intimately admixing (1) a binder phase including (a) at least one phosphorus compound and (b) at least one magnesium compound reactive therewith in the presence of water, and (2) at least one hydrogenated alkyl silicone compound.

2. A process for formulation of a phosphomagnesia composition of matter settable into a water-insensitive cement, comprising intimately admixing (i) a binder phase including (a) at least one phosphorus compound and (b) at least one magnesium compound reactive therewith in the presence of water, (ii) a cementitious aggregate, and (iii) a water sensitivity-reducing amount of at least one silicone compound.

3. The process as defined by claim 2, further comprising a setting amount of water.

4. The process as defined by claim 1, said at least one silicone compound comprising an organopolysiloxane.

5. The process as defined by claim 4, said at least one phosphorus compound comprising phosphorus pentoxide or precursor thereof.

6. The process as defined by claim 5, said at least one magnesium compound comprising magnesium oxide, magnesium hydroxide, or magnesium carbonate.

7. The process as defined by claim 5, said at least one phosphorus compound comprising phosphoric acid, orthophosphoric acid, pyrophosphoric acid, a polyphosphoric acid, or salt thereof.

8. The process as defined by claim 5, said at least one phosphorus compound comprising a phosphate, hydrogen phosphate, orthophosphate, pyrophosphate, polyphosphate, tripolyphosphate or tetrapolyphosphate of aluminum, calcium, potassium, magnesium, or ammonium, or mixture thereof.

9. The process as defined by claim 5, said at least one phosphorus compound comprising solid particulates.

10. The process as defined by claim 9, said solid particulates having a granulometry of up to 300 μm.

11. The process as defined by claim 5, said at least one phosphorus compound being adsorbed onto porous support.

12. The process as defined by claim 6, said at least one magnesium compound comprising solid particulates.

13. The process as defined by claim 12, said solid particulates having a granulometry ranging from 10 to 500 μm.

14. The process as defined by claim 6, having a ratio of magnesium values to phosphorus values ranging from 1 to 3.

15. The process as defined by claim 2, comprising from about 10 to 40 parts by weight of said binder phase.

16. The process as defined by claim 2, further comprising at least one setting retardant.

17. The process as defined by claim 16, said at least one setting retardant comprising a carboxylic acid; an acid, ester or salt containing boron; an acid, ester or salt containing phosphorus; ferrous sulfate; sodium sulfate or lignosulfonate; zinc chloride; copper acetate; sodium gluconate; sulfate/acetate of sodium cellulose; formaldehyde/aminolignosulfate reaction product; dialdehyde starch; N,N-dimethyloldihydroxy-ethylene urea; a silicofluoride; tall oil; sucrose; or mixture thereof.

18. The process as defined by claim 16, wherein said at least one setting retardant is a powder.

19. The process as defined by claim 2, said at least one silicone compound has recurring polysiloxane structural units $R_1SiO_{0.5}$, $R_2SiO$, $R_3SiO_{1.5}$ and/or $SiO_2$, wherein $R_1$, $R_2$ and $R_3$, which may be identical or different, are hydrogen, a linear or branched alkyl radical, a vinyl radical, a phenyl radical or a 3,3,3-trifluoropropyl radical.

20. The process as defined by claim 19, said at least one silicone compound comprising a hydrogenated alkyl silicone.

21. The process as defined by claim 2, comprising at most 2 parts by weight of said at least one silicone compound.

22. The process as defined by claim 2, said cementitious aggregate comprising silica, alumina, zirconium oxide, dolomite, chrome ore, limestone, clinker, vermiculite, perlite, or ash.

23. The process as defined by claim 2, comprising from about 60 to 90 parts by weight of said cementitious aggregate.

24. The process as defined by claim 2, further comprising a liquefying agent, an anti-foaming agent, or combination thereof.

* * * * *